( 12 ) United States Patent
Katayama et al.

(10) Patent No.: US 9,972,816 B2
(45) Date of Patent: May 15, 2018

(54) SLURRY FOR FORMING INSULATING LAYER, SEPARATOR FOR ELECTROCHEMICAL DEVICE, METHOD FOR PRODUCING THE SAME, AND ELECTROCHEMICAL DEVICE

(71) Applicant: MicroConnect Corp., Marshall, TX (US)

(72) Inventors: Hideaki Katayama, Ibaraki (JP); Hiroshi Abe, Ibaraki (JP); Nobuaki Matsumoto, Ibaraki (JP); Toshihiro Abe, Ibaraki (JP); Yasutaka Kuroki, Ibaraki (JP)

(73) Assignee: MICROCONNECT CORP., Marshall, TX (US)

( * ) Notice: Subject to any disclaimer, the term of this patent is extended or adjusted under 35 U.S.C. 154(b) by 0 days. days.

(21) Appl. No.: 14/682,783

(22) Filed: Apr. 9, 2015

(65) Prior Publication Data

US 2015/0236318 A1    Aug. 20, 2015

Related U.S. Application Data

(62) Division of application No. 12/676,806, filed as application No. PCT/JP2009/051429 on Jan. 29, 2009, now abandoned.

(30) Foreign Application Priority Data

Jan. 29, 2008   (JP) .................. 2008-017004
Feb. 22, 2008   (JP) .................. 2008-040972
Aug. 8, 2008    (JP) .................. 2008-205040

(51) Int. Cl.
*H01M 2/14*    (2006.01)
*H01M 2/16*    (2006.01)

(52) U.S. Cl.
CPC .......... *H01M 2/145* (2013.01); *H01M 2/166* (2013.01); *H01M 2/1666* (2013.01); *H01M 2/1673* (2013.01); *H01M 2/1686* (2013.01)

(58) Field of Classification Search
None
See application file for complete search history.

(56) References Cited

U.S. PATENT DOCUMENTS 5,180,647 A  *  1/1993  Rowland ............. H01M 2/1613
                                                      429/143
5,216,207 A  *  6/1993  Prabhu .................. C03C 14/004
                                                      106/1.13

(Continued)

FOREIGN PATENT DOCUMENTS

CN    1493636 A    5/2004
CN    1982347 A    6/2007

(Continued)

OTHER PUBLICATIONS

Chinese Office Action for corresponding Chinese Application No. 200980100306.1 dated Apr. 13, 2012.

(Continued)

*Primary Examiner* — Ula C Ruddock
*Assistant Examiner* — Amanda Barrow
(74) *Attorney, Agent, or Firm* — Birch, Stewart, Kolasch & Birch, LLP

(57) ABSTRACT

A slurry for forming an insulating layer of the present invention includes heat-resistant insulating fine particles, a thickening agent, and a dispersion medium. The insulating fine particles are dispersed in the dispersion medium. The slurry for forming an insulating layer has a viscosity of 5 to 500 mPa·s. The proportion of particles with a particle size of 1 μm or less in the insulating fine particles is 30 vol % or more and the proportion of particles with a particles size of 3 μm or more in the insulating fine particles is 10 vol % or (Continued)

less. An electrochemical device of the present invention includes a separator for an electrochemical device of the present invention that is produced using the slurry for forming an electrochemical device of the present invention.

11 Claims, 1 Drawing Sheet

(56) References Cited

U.S. PATENT DOCUMENTS

| | | | | |
|---|---|---|---|---|
| 5,827,797 | A * | 10/1998 | Cass | C04B 35/62227 264/28 |
| 5,830,603 | A | 11/1998 | Oka et al. | |
| 5,869,208 | A * | 2/1999 | Miyasaka | H01M 4/131 429/215 |
| 6,387,564 | B1 * | 5/2002 | Yamashita | H01M 2/164 29/623.3 |
| 6,447,958 | B1 | 9/2002 | Shinohara et al. | |
| 2001/0005560 | A1 * | 6/2001 | Yoshida | H01M 2/145 429/144 |
| 2002/0055046 | A1 | 5/2002 | Ono et al. | |
| 2002/0168569 | A1 | 11/2002 | Barriere et al. | |
| 2002/0192561 | A1 * | 12/2002 | Noh | H01M 2/145 429/254 |
| 2003/0235685 | A1 | 12/2003 | Lofton et al. | |
| 2004/0244675 | A1 | 12/2004 | Kishimoto et al. | |
| 2006/0127753 | A1 | 6/2006 | Nakashima et al. | |
| 2006/0188786 | A1 | 8/2006 | Lee et al. | |
| 2006/0199294 | A1 | 9/2006 | Fujikawa et al. | |
| 2006/0222952 | A1 * | 10/2006 | Kono | H01M 4/136 429/231.95 |
| 2006/0248710 | A1 * | 11/2006 | Fukumoto | H01M 4/0414 29/623.5 |
| 2007/0042270 | A1 * | 2/2007 | Ohata | H01M 2/166 429/246 |
| 2007/0082261 | A1 | 4/2007 | Lee | |
| 2007/0122716 | A1 * | 5/2007 | Seo | H01M 2/1646 429/251 |
| 2007/0264577 | A1 * | 11/2007 | Katayama | H01M 2/162 429/246 |
| 2008/0038631 | A1 | 2/2008 | Nakura et al. | |
| 2008/0139737 | A1 | 6/2008 | Alderfer et al. | |
| 2009/0136848 | A1 * | 5/2009 | Minami | H01M 10/058 429/224 |
| 2009/0181300 | A1 | 7/2009 | Kim | |
| 2009/0197181 | A1 | 8/2009 | Sakitani et al. | |
| 2009/0208840 | A1 | 8/2009 | Ogasawara et al. | |
| 2009/0325074 | A1 | 12/2009 | Fukumoto et al. | |
| 2010/0173187 | A1 | 7/2010 | Nishikawa et al. | |
| 2010/0190063 | A1 | 7/2010 | Fukumoto et al. | |
| 2010/0285348 | A1 | 11/2010 | Murata et al. | |
| 2011/0006253 | A1 * | 1/2011 | Kim | H01M 4/1397 252/182.1 |
| 2011/0121331 | A1 * | 5/2011 | Simonian | H01L 33/504 257/98 |
| 2011/0294007 | A1 | 12/2011 | Hosaka et al. | |
| 2012/0045642 | A1 | 2/2012 | Nishimura et al. | |
| 2015/0228971 | A1 * | 8/2015 | Kim | H01M 10/0525 429/223 |

FOREIGN PATENT DOCUMENTS

| | | | |
|---|---|---|---|
| CN | 101006595 A | 7/2007 | |
| CN | 101048892 A | 10/2007 | |
| EP | 1115166 A1 | 7/2001 | |
| EP | 1826842 A1 | 8/2007 | |
| EP | 2079121 A1 | 7/2009 | |
| JP | 07-268118 * | 10/1995 | ............... C08J 9/00 |
| JP | 7-308563 A | 11/1995 | |
| JP | 10-162826 A | 6/1998 | |
| JP | 10-172531 A | 6/1998 | |
| JP | 10-223195 A1 | 8/1998 | |
| JP | 11-80395 A | 3/1999 | |
| JP | 2001-138457 A | 5/2001 | |
| JP | 2002-334721 A | 11/2002 | |
| JP | 2003-20647 A | 7/2003 | |
| JP | 2005-63846 A | 3/2005 | |
| JP | 2006-66141 A | 3/2006 | |
| JP | 2006-169503 A | 6/2006 | |
| JP | 2007-273443 A | 10/2007 | |
| JP | 2007-280911 A | 10/2007 | |
| JP | 2008-016313 * | 1/2008 | ............. H01M 4/04 |
| JP | 2008-16313 A | 1/2008 | |
| JP | 2009-170421 A | 7/2009 | |
| WO | WO 2006/062153 A1 | 6/2006 | |
| WO | WO 2006/064775 A1 | 6/2006 | |
| WO | WO 2006/093049 A1 | 9/2006 | |
| WO | WO 2007/066768 A1 | 6/2007 | |
| WO | WO 2007/108426 * | 9/2007 | ............ H01M 10/36 |
| WO | WO 2008/093575 A1 | 8/2008 | |
| WO | WO 2008/156033 A1 | 12/2008 | |

OTHER PUBLICATIONS

Japanese Office Action dated May 16, 2013 for Application No. 2009-551553.

Japanese Office Action for Application No. 2009-551553 dated Jun. 28, 2012.

Japanese Office Action for Japanese Application No. 2009-551553, dated Dec. 2, 2014.

* cited by examiner

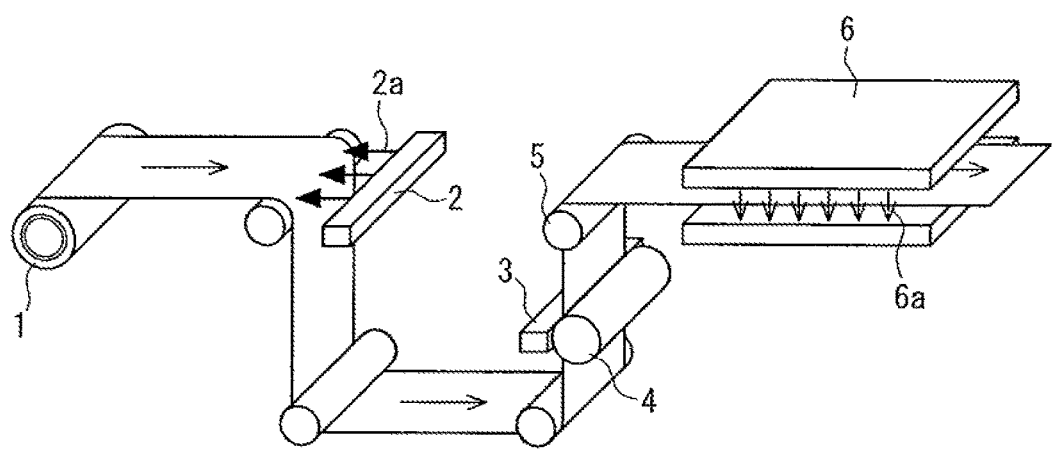

SLURRY FOR FORMING INSULATING LAYER, SEPARATOR FOR ELECTROCHEMICAL DEVICE, METHOD FOR PRODUCING THE SAME, AND ELECTROCHEMICAL DEVICE

CROSS-REFERENCE TO RELATED APPLICATIONS

This application is a Divisional of co-pending application Ser. No. 12/676,806 filed on Mar. 23, 2010, which is a National Phase of PCT International Application No. PCT/JP2009/051429 filed on Jan. 29, 2009, which claims priority under 35 U.S.C. § 119(a) to Patent Application No. 2008-017004 filed in Japan on Jan. 29, 2008, Patent Application No. 2008-040972 filed in Japan on Feb. 22, 2008, and Patent Application No. 2008-205040 filed in Japan on Aug. 8, 2008. All of the above applications are hereby expressly incorporated by reference into the present application.

TECHNICAL FIELD

The present invention relates to a slurry for forming an insulating layer suitable for the constituent of a separator for an electrochemical device, a separator for an electrochemical device having an insulating layer formed of the slurry and a method for producing the separator, and an electrochemical device including the separator.

BACKGROUND ART

A lithium secondary battery, which is a type of an electrochemical device, is characterized by a high energy density and thus has been widely used as a power source for portable equipment such as a portable telephone and a notebook personal computer. The capacity of the lithium secondary battery is likely to increase further as the performance of the portable equipment becomes higher. For this reason, it is important to ensure the safety of the lithium secondary battery.

In the current lithium secondary battery, e.g., a polyolefin microporous film (microporous film) with a thickness of about 20 to 30 µm is used as a separator that is interposed between a positive electrode and a negative electrode. The separator may require a so-called shutdown function to improve the safety of the battery. The shutdown function increases the internal resistance of the battery by melting the resin of the separator at a temperature not more than the abnormal heat generation temperature (thermal runaway temperature) of the battery so as to close the pores of the separator. Therefore, the material of the separator is preferably polyethylene having a low melting point.

To improve the porosity and the strength, the above separator may be formed of a uniaxially- or biaxially-oriented film. Since the separator is provided as an independent film, certain strength is needed in view of workability, and the drawing ensures the strength of the separator. In such a uniaxially- or biaxially-oriented film, however, the degree of crystallinity is increased, and the temperature at which a shutdown is to be effected (i.e., the shutdown temperature) is also raised close to the thermal runaway temperature of the battery. Thus, it is hard to say that the margin for safety of the battery is sufficient.

Moreover, the film has been distorted by drawing and may shrink due to residual stress when it is subjected to high temperatures. The shrinkage temperature is very close to the melting point of the resin of the film, namely the shutdown temperature. Therefore, when the polyolefin microporous film is used as a separator, a rise in temperature of the battery has to be prevented by reducing the current as soon as the temperature of the battery reaches the shutdown temperature due to charging anomaly or the like. If the pores are not sufficiently closed and the current cannot be immediately reduced, the temperature of the battery is easily raised to the shrinkage temperature of the separator, so that an internal short circuit can occur.

As a technology for improving the reliability of the battery by preventing a short circuit due to the thermal shrinkage of the separator, e.g., an electrochemical device including a separator that includes a porous base having good heat resistance, inorganic fine particles, and a resin component for ensuring the shutdown function has been proposed (Patent Documents 1 and 2).

Patent Document 1: WO 2006/062153
Patent Document 2: WO 2007/066768

The technologies disclosed in Patent Documents 1 and 2 can provide an electrochemical device that is not likely to cause thermal runaway even in the case of abnormal heat generation and achieves excellent safety.

Patent Documents 1 and 2 also disclose a method for producing a separator by using the inorganic fine particles and applying a slurry in which the inorganic fine particles are dispersed to the base or the like.

However, the inorganic fine particles have a higher specific gravity compared to the media such as water and an organic solvent, and therefore are likely to be settled in the slurry. In particular, if the particle size is 1 µm or less, the fine particles are likely to be agglomerated together. Thus, it may be difficult to maintain a stable dispersion state of the fine particles in the slurry.

When the dispersion state of the fine particles in the slurry cannot be stably maintained, the fine particles are agglomerated or settled during storage of the slurry. When the slurry in which the fine particles are agglomerated or settled is applied to the base or the like, the application tends to be not uniform. Moreover, when the dispersion state of the fine particles in the slurry is particularly unstable, the fine particles are agglomerated or settled in the period of time between the application and drying of the slurry. This may result in non-uniformity of the surface to which the slurry is applied.

The non-uniform application of the slurry reduces the evenness of the separator produced. Consequently, in the lithium secondary battery, the ionic conduction is not uniform within the separator, which may cause a deficiency such as a deposition of lithium during charging of the battery particularly at a high current density. Moreover, if the deposited lithium becomes a dendrite crystal, a short circuit may occur due to the lithium dendrite.

Accordingly, in the slurry used to produce a separator, it is preferable that the stability of the dispersion state of the fine particles or the like is improved to further stabilize the quality of the separator to be produced. In this regard, the technologies of Patent Documents 1 and 2 still have room for improvement.

DISCLOSURE OF INVENTION

Therefore, with the foregoing in mind, it is an object of the present invention to provide a slurry for forming an insulating layer that is applicable to a separator for an electrochemical device and has both ion permeability and heat resistance, the slurry capable of achieving the uniform dispersion of fine particles and maintaining the dispersion state stably. It is also an object of the present invention to provide a separator for an electrochemical device that is produced using the slurry and a method for producing the separator. Moreover, it is also an object of the present invention to provide an electrochemical device including the separator.

A slurry for forming an insulating layer of the present invention is capable of being used to form an insulating layer of a separator for an electrochemical device and includes heat-resistant insulating fine particles, a thickening agent, and a dispersion medium. The insulating fine particles are dispersed in the dispersion medium. The slurry for forming an insulating layer has a viscosity of 5 to 500 mPa·s. The proportion of particles with a particle size of 1 μm or less in the insulating fine particles is 30 vol % or more and the proportion of particles with a particle size of 3 μm or more in the insulating fine particles is 10 vol % or less.

A separator for an electrochemical device (which may be simply referred to as a "separator" in the following) of the present invention includes a porous insulating layer. The insulating layer includes heat-resistant insulating fine particles and a binder. The proportion of particles with a particle size of 1 μm or less in the insulating fine particles is 30 vol % or more and the proportion of particles with a particle size of 3 μm or more in the insulating fine particles is 10 vol % or less.

A method for producing a separator for an electrochemical device of the present invention produces a separator for an electrochemical device that includes a porous insulating layer. The method includes applying the slurry for forming an insulating layer of the present invention to at least one base selected from the group consisting of a positive electrode, a negative electrode, and a porous base material and drying the base to which the slurry for forming an insulating layer is applied.

An electrochemical device of the present invention includes a positive electrode, a negative electrode, and the separator for an electrochemical device of the present invention.

The slurry for forming an insulating layer of the present invention is capable of achieving the uniform dispersion of the insulating fine particles and maintaining the dispersion state stably. The separator for an electrochemical device of the present invention is produced using the slurry for forming an insulating layer of the present invention and thus can have excellent heat resistance. The electrochemical device of the present invention includes the separator for an electrochemical device of the present invention and thus can have high reliability. Moreover, the method for producing a separator for an electrochemical device of the present invention can produce the separator stably and continuously.

BRIEF DESCRIPTION OF DRAWINGS

FIG. 1 is a schematic view showing an example of a coating apparatus that is applicable to the production of a separator of the present invention.

BEST MODE FOR CARRYING OUT THE INVENTION

Embodiment 1

First, an embodiment of a slurry for forming an insulating layer of the present invention will be described. The slurry for forming an insulating layer of the present invention is used to form a porous insulating layer that can constitute a separator for an electrochemical device, and is obtained by dispersing at least heat-resistant insulating fine particles (which may be simply referred to as "insulating fine particles" in the following) and a thickening agent in a dispersion medium. The thickening agent may be dissolved in the dispersion medium.

In the separator for an electrochemical device that is produced using the slurry for forming an insulating layer of the present invention, the insulating fine particles have the effects of increasing the heat resistance of the separator, improving the dimensional stability of the separator at high temperatures, and suppressing the occurrence of a small short circuit due to the lithium dendrite.

The insulating fine particles are not particularly limited as long as they have electrical insulation and electrochemical stability, are stable to an organic electrolyte (which may be referred to as an "electrolyte" in the following and will be described in detail later) of an electrochemical device and to the dispersion medium of the slurry, and are not dissolved in the electrolyte under high temperature conditions.

In the present specification, the "insulating fine particles that are stable to the organic electrolyte" indicate the insulating fine particles that are neither deformed nor changed in chemical composition in the organic electrolyte (which is used as an electrolyte of the electrochemical device). Moreover, in the present specification, the "high temperature conditions" specifically require a temperature of 150° C. or higher. Thus, the insulating fine particles can be any stable particles that are neither deformed nor changed in chemical composition in the electrolyte at a temperature in this range. In other words, the heat resistance of the "heat-resistant insulating fine particles" means that the insulating fine particles are neither deformed nor changed in chemical composition in the electrolyte at at least 150° C. In the present specification, the phrase "electrochemically stable" means that no chemical change occurs during charging/discharging of the electrochemical device.

Specific examples of the insulating fine particles include the following: fine particles of oxides such as an iron oxide, $Al_2O_3$ (alumina), $SiO_2$ (silica), $TiO_2$, $BaTiO_3$, and $ZrO_2$; fine particles of nitrides such as an aluminum nitride and a silicon nitride; fine particles of hardly-soluble ionic crystals such as a calcium fluoride, a barium fluoride, and a barium sulfate; fine particles of covalent crystals such as silicon and diamond; fine particles of clays such as talc and montmorillonite; and materials derived from the mineral resources such as boehmite, zeolite, apatite, kaoline, mullite, spinel, olivine, sericite, and bentonite or artificial products of these materials. Moreover, the insulating fine particles may be electrically insulating fine particles obtained by covering the surfaces of conductive fine particles with a material having electrical insulation (e.g., any of the above materials constituting the insulating fine particles). Examples of the conductive fine particles include metal fine particles, oxide fine particles such as $SnO_2$ and an indium tin oxide (ITO), and carbonaceous fine particles such as carbon black and graphite. Among the above insulating fine particles, the fine particles of at least one selected from alumina, silica, and boehmite are suitable. These examples of the insulating fine particles may be used individually or in combinations of two or more.

The insulating fine particles can have any shape such as spherical, polyhedral, or plate-like particles, and preferably include the plate-like particles. Moreover, all the insulating fine particles may be in the form of plate-like particles. Various commercial products are available as the plate-like particles. Examples of the commercial products include the following: $SiO_2$, "SUNLOVELY (trade name)" manufactured by AGC Si-Tech Co., Ltd.; $TiO_2$, a ground product of "NST-B1 (trade name)" manufactured by ISHIHARA SANGYO KAISHA, LTD.; a plate-like barium sulfate, "H series (trade name)" and "HL series (trade name)" manufactured by SAKAI CHEMICAL INDUSTRY CO., LTD.; talc, "MICRON WHITE (trade name)" manufactured by Hayashi Kasei Co., Ltd.; bentonite, "BEN-GEL (trade name)" manufactured by Hayashi Kasei Co., Ltd.; boehmite, "BMM (trade name)" and "BMT (trade name)" manufactured by KAWAI LIME INDUSTRY CO., LTD.; alumina, "Serashyru BMT-B (trade name)" manufactured by KAWAI LIME INDUSTRY CO., LTD.; alumina, "SERATH (trade name)" manufactured by KINSEI MATEC CO., LTD.; and sericite, "HIKAWA-MICA Z-20 (trade name)" manufactured by Hikawa Kogyo Co., Ltd. In addition to the above, $SiO_2$, $Al_2O_3$, $ZrO_2$, and $CeO2$ can be produced by the method disclosed in JP 2003-206475 A.

In the separator, when the plate-like insulating fine particles are oriented with their plane surfaces substantially parallel to the surface of the separator, the occurrence of a short circuit can be more successfully suppressed. The reason for this is considered as follows. By orienting the plate-like insulating fine particles in the above manner, the insulating fine particles are arranged so that their plane surfaces overlap with one another. Therefore, pores (through holes) going from one side to the other of the separator are formed in a curve rather than a line (i.e., a tortuosity factor of the pores is increased). This can prevent the lithium dendrite from passing through the separator and thus suppress the occurrence of a short circuit more successfully.

When the insulating fine particles are in the form of plate-like particles, e.g., the aspect ratio (the maximum length of the plate-like particles/the thickness of the plate-like particles) is in the range of preferably 5, more preferably 10 to preferably 100, more preferably 50. The average value of the ratios of length in the major axis direction and length in the minor axis direction (the length in the minor axis direction/the length in the major axis direction) of the plane surfaces of the plate-like particles is preferably 0.3 or more, and more preferably 0.5 or more. In this case, the average value may be 1, that is, the length in the major axis direction may be substantially the same as that in the minor axis direction. When the plate-like insulating fine particles have the aspect ratio and the average value of the ratios of length in the major axis direction and length in the minor axis direction of the plane surfaces, as described above, the effect of preventing a short circuit can be more effectively achieved.

The average value of the ratios of length in the major axis direction and length in the minor axis direction of the plane surfaces of the plate-like insulating fine particles can be determined, e.g., by analyzing the scanning electron microscope (SEM) images. The aspect ratio of the plate-like insulating fine particles also can be determined by analyzing the SEM images.

The insulating fine particles preferably include secondary particles formed by agglomeration of primary particles, and all the insulating fine particles may be fine particles having a secondary particle structure. The secondary particles can be agglomerates that are not easily separated into the primary particles in the general dispersion process. For example, the secondary particles can be formed by intergrowth of the primary particles. Examples of such fine particles include the following: boehmite, "C06 (trade name)" and "C20 (trade name)" manufactured by TAIMEI CHEMICALS CO., LTD.; $CaCO_3$, "ED-1 (trade name)" manufactured by KOMESHO SEKKAI KOGYO CO., LTD.; and clay, "Zeolex 94HP (trade name)" manufactured by J. M. Huber Corporation.

When the insulating fine particles include fine particles having a secondary particle structure in which the primary particles are agglomerated, the secondary particles impede the closest packing of the particles, so that the pores of the insulating layer can be made larger. Thus, the electrochemical device such as a lithium secondary battery that includes the separator having this insulating layer is suitable for applications requiring higher power such as an electric vehicle, a hybrid vehicle, an electric motorcycle, a power-assisted bicycle, a power tool, and a shaver.

The average dispersion particle size of the insulating fine particles is in the range of preferably 0.01 µm, more preferably 0.1 µm to preferably 1.5 µm, more preferably 1 µm.

When the insulating fine particles of the slurry for forming an insulating layer of the present invention are dispersed in the dispersion medium, the proportion of particles with a particle size of 1 µm or less in all the dispersed particles is 30 vol % or more and the proportion of particles with a particle size of 3 µm or more in all the dispersed particles is 10 vol % or less. For the insulating fine particles including many fine particles, although the insulating layer having better heat resistance can be easily formed, the fine particles are likely to be agglomerated together. Thus, it may be difficult to maintain a stable dispersion state of the fine particles in the slurry. However, the slurry of the present invention can maintain the uniform dispersion state for a long time even if it includes many fine particles, as described above. As the proportion of coarse particles becomes smaller, the thickness of the insulating layer can be reduced while maintaining the excellent heat resistance. Therefore, the insulating fine particles dispersed in the dispersion medium include preferably 10 vol % or less of particles with a particles size of 3 µm or more, and more preferably 10 vol % or less of particles with a particles size of 2 µm or more.

In the present specification, the particle size of the insulating fine particles can be determined from a volume-based particle size distribution that is measured, e.g., with a laser diffraction particle size analyzer ("MT-3000 (trade name)" manufactured by NIKKISO CO., LTD.) by dispersing the insulating fine particles in a medium in which the insulating fine particles do not dissolve or swell (e.g., the dispersion medium used for the slurry). That is, the average particle size, the proportion of particles with a particle size of 1 µm or less, and the proportion of particles with a particle size of 3 µm or more can be determined from the cumulative frequency obtained by measuring the volume-based particle size distribution of the insulating fine particles.

The slurry for forming an insulating layer of the present invention includes the thickening agent. The use of the thickening agent can adjust the viscosity of the slurry in a suitable range, make the dispersion of the insulating fine particles uniform, and maintain a good dispersion state stably.

The thickening agent is not particularly limited as long as it can control the slurry at a necessary viscosity without causing a side effect such as agglomeration of the insulating fine particles in the slurry. However, it is preferable that only a small amount of the thickening agent can effectively increase the viscosity. It is also preferable that the thickening agent can be well dissolved or dispersed in the dispersion medium used for the slurry. If many undissolved matters or agglomerates of the thickening agent are present in the slurry, the dispersion of the insulating fine particles is not uniform. This leads to a non-uniform distribution of the insulating fine particles in the insulating layer that is formed by applying the slurry to a base material or the like and drying the base material. Therefore, the heat resistance of the insulating layer is reduced, which in turn reduces the reliability and heat resistance of the electrochemical device.

As a measure of the amount of undissolved matters or agglomerates of the thickening agent that remains in the slurry, when the slurry passes through a mesh filter with an aperture of 30 µm, the number of residue on the filter is preferably one or less per 1 L of the slurry, and more preferably one or less per 5 L of the slurry.

Specific examples of the thickening agent include the following: synthetic polymers such as polyethylene glycol, a polyacrylic acid, polyvinyl alcohol, and a vinyl methyl ether-maleic anhydride copolymer; cellulose derivatives such as carboxymethyl cellulose, hydroxyethyl cellulose, and hydroxypropyl cellulose; natural polysaccharides such as xanthan gum, welan gum, gellan gum, guar gum, and carrageenan; starches such as dextrin and a pregelatinized starch; clay minerals such as montmorillonite and hectorite; and inorganic oxides such as fumed silica, fumed alumina, and fumed titania. These examples of the thickening agent may be used individually or in combinations of two or more. In the case of the clay minerals or the inorganic oxides, it is preferable that they include primary particles with a smaller particle size (e.g., about several to several tens of nanometers) than the insulating fine particles and have a structure in which many primary particles are joined (e.g., fumed silica).

Among the above thickening agents, the natural polysaccharides are more preferred because they have high solubility in water (i.e., the dispersion medium suitable for the slurry for forming an insulating layer) and are highly effective in increasing the viscosity with a small amount. Moreover, the xanthan gum, the welan gum, and the gellan gum are further preferred, and the xanthan gum is particularly preferred. When thixotropy is imparted to the slurry, the inorganic oxides such as fumed silica, fumed alumina, and fumed titania are preferably added.

The content of the thickening agent in the slurry varies depending on the predetermined viscosity of the slurry. For example, if the thickening agent does not evaporate in the drying process after the application of the slurry, it remains in the insulating layer. Therefore, the thickening agent should not be used in a large amount. Specifically, the content of the thickening agent is preferably 10 vol % or less, more preferably 5 vol % or less, and further preferably 1 vol % or less of the total volume of the solids in the slurry (i.e., the components other than the dispersion medium, which is true in the following). Moreover, the content of the thickening agent is preferably 0.1 vol % or more of the total volume of the solids in the slurry.

It is preferable that the slurry for forming an insulating layer of the present invention includes a dispersing agent. With the use of the dispersing agent, e.g., the dispersibility of the insulating fine particles in the slurry can be further improved, since the dispersing agent adheres to the surfaces of the insulating fine particles. This can prevent agglomeration of the insulating fine particles and thus maintain the dispersion state of the insulating fine particles more stably.

For example, when the insulating fine particles are in the form of plate-like particles, the plane surfaces of the individual particles may be arranged in layers depending on the manufacturing method (such as plate-like boehmite). Moreover, if the slurry including layered particles is used to form an insulating layer, the insulating layer could not sufficiently provide the effect of preventing a short circuit due to the plate-like particles. However, if the slurry is prepared by using the dispersing agent along with the layered particles, the particles can be separated from one another and uniformly dispersed in the slurry. Therefore, even if the plate-like particles are used, the slurry including the dispersing agent can form an insulating layer that exhibits the above effect more suitably.

Specific examples of the dispersing agent include an anionic surface-active agent, a cationic surface-active agent, a nonionic surface-active agent, and polymer dispersing agents such as a polycarboxylic acid, a polyacrylic acid, a polymethacrylic acid, polycarboxylate, polyacrylate, and polymethacrylate. More specifically, examples of the dispersing agent include the following: "ADEKA TOL (trade name) series" and "ADEKA NOL (trade name) series" manufactured by ADEKA CORPORATION; "SN-Dispersant (trade name) series" manufactured by SAN NOPCO LIMITED; "POLITY (trade name) series", "ARMEEN (trade name) series", and "DUOMEEN (trade name) series" manufactured by LION CORPORATION; "HOMOGENOL (trade name) series", "RHEODOL (trade name) series", and "AMIET (trade name) series" manufactured by KAO CORPORATION; "FARPACK (trade name) series", "CERAMISOL (trade name) series", and "POLYSTER (trade name) series" manufactured by NOF CORPORATION; "AJISPER (trade name) series" manufactured by Ajinomoto Fine-Techno Co., Inc.; and "Aron Dispersant (trade name) series" manufactured by TOAGOSEI CO., LTD. These examples of the dispersing agent may be used individually or in combinations of two or more.

Among the above dispersing agents, the dispersing agent including a plurality of ion-dissociable acid groups (such as a carboxyl group, a sulfonic group, an amino acid group, and a maleic acid group) or a plurality of ion-dissociable salt groups (such as a carboxylate group, a sulfonate group, and a maleate group) is preferred, and the polycarboxylate, the polyacrylate, and the polymethacrylate are more preferred. In the case where the polymer dispersing agent is a salt (i.e., the polymer dispersing agent has a salt group), an ammonium salt is suitable.

The content of the dispersing agent in the slurry is preferably 0.1 parts by mass or more, and more preferably 0.3 parts by mass or more per 100 parts by mass of the insulating fine particles so as to provide the effect of the dispersing agent more effectively. If the content of the dispersing agent in the slurry is too large, the effect of the dispersing agent becomes saturated, while the ratio of other components to the dispersing agent in the insulating layer is reduced, and thus the effects of the other components can be reduced. Therefore, the content of the dispersing agent in the slurry is preferably 5 parts by mass or less, and more preferably 1 part by mass or less per 100 parts by mass of the insulating fine particles.

The slurry for forming an insulating layer of the present invention may include a binder in order to bind the insulating fine particles to one another or to the other constituents (as will be described later) in the insulating layer to be formed. The binder also can be used to bond the insulating layer with the base material or the like. The type of the binder is not particularly limited as long as it is electrochemically stable in the electrochemical device and is stable to the electrolyte of the electrochemical device. The above thickening agent having the function of a binder also can serve as a binder.

Specific examples of the binder include the following: an ethylene-vinyl acetate copolymer (EVA having 20 to 35 mol % of a structural unit derived from vinyl acetate); (meta) acrylic acid copolymers such as an ethylene-ethyl acrylate copolymer, and an ethylene-ethyl methacrylate copolymer; fluoro-rubber; styrene-butadiene rubber (SBR); polyvinyl alcohol (PVA); polyvinyl butyral (PVB); polyvinyl pyrrolidone (PVP); poly-N-vinylacetamide; a crosslinked acrylic resin; polyurethane; and an epoxy resin. These examples of the binder may be used individually or in combinations of two or more.

Among the above binders, the heat-resistant resins having heat resistance at 150° C. or higher are suitable. In particular, highly flexible materials such as the ethylene-acrylic acid copolymer, the fluoro-rubber, and the SBR are more suitable. Specific examples of the highly flexible materials include the following: EVA, "EVAFLEX series (trade mane)" manufactured by DU PONT-MITSUI POLYCHEMICALS CO., LTD.; EVA manufactured by NIPPON UNICAR CO., LTD.; an ethylene-acrylic acid copolymer, "EVAFLEX-EEA series (trade name)" manufactured by DU PONT-MITSUI POLYCHEMICALS CO., LTD.; EEA manufactured by NIPPON UNICAR CO., LTD.; fluoro-rubber, "DAI-EL LATEX series (trade name)" manufactured by DAIKIN INDUSTRIES, Ltd.; SBR, "TRD-2001 (trade name)" manufactured by JSR Corporation; and SBR, "EM-400B (trade name)" manufactured by ZEON CORPORATION. Moreover, the (meta) acrylic acid copolymer formed by the polymerization of monomers including (meta) acrylic acids as the main components is also suitable. In the present specification, the "(meta)acrylic acid" means both acrylic acid and methacrylic acid.

In particular, the self-crosslinking (meta)acrylic acid copolymer is more preferred, and the self-crosslinking (meta)acrylic acid copolymer with a glass transition temperature (Tg) of −20° or lower is further preferred. Specific examples of this copolymer having the Tg include a copolymer in which the end of the side-chain ester group is an alkyl group with a carbon number of 2 to 10. More specifically, the copolymer in which the end of the side-chain ester group is mainly composed of n-propyl group, isopropyl group, n-butyl group, sec-butyl group, and n-hexyl group is even more preferred. If the carbon number of the end alkyl group of the side-chain ester group is too small, the Tg of the binder becomes higher, and the flexibility of the binder is reduced. If the carbon number of the end alkyl group of the side-chain ester group is too large, the side chains are crystallized, and the flexibility of the binder is reduced as well.

As will be described in detail later, the insulating layer formed of the slurry of the present invention can be obtained in such a manner that the slurry is applied to a base material or the like and then dried to remove the solvent. In this case, if the slurry contains the self-crosslinking (meta)acrylic acid copolymer, the copolymer spontaneously crosslinks to form a crosslinked structure during the drying process. Therefore, since the binder acts to increase the adhesion between the insulating fine particles or between the insulating fine particles and the other constituents (such as a microporous film), the insulating layer can have good electrolyte resistance, and the stability of the slurry can be improved.

With the use of the self-crosslinking (meta)acrylic acid copolymer as the binder, the insulating fine particles are held by a crosslinked body of the self-crosslinking (meta)acrylic acid copolymer. Thus, the electrolyte resistance of the insulating layer can be improved, compared to the case where the binder is not self crosslinkable. If the binder inherently has a crosslinked structure, the slurry is dried while the binder particles retain their shapes, so that the contact area of the binder with the insulating fine particles or the base material may be reduced. In contrast, the self-crosslinking (meta)acrylic acid copolymer spontaneously crosslinks to form a crosslinked structure during the drying process, and therefore can improve the binding properties of the insulating layer, compared to the binder inherently having a crosslinked structure. Moreover, when a so-called two-component binder that has a crosslinked structure by adding a crosslinking agent to the resin (main component) is used, the stability of the slurry may be reduced due to the crosslinking agent, although the electrolyte resistance and the adhesion of the binder to other members can be better. However, the use of the self-crosslinking (meta)acrylic acid copolymer can maintain the stability of the slurry.

The self-crosslinking (meta)acrylic acid copolymer may be obtained by a conventionally known method. For example, a (meta)acrylic acid copolymer is synthesized in a usual manner using monomers that can impart self cross linkage to the copolymer. The monomer capable of imparting the self-cross linkage may be, e.g., an unsaturated monomer having a self-crosslinking functional group, or a combination of a monomer having a functional group such as a hydroxyl group or carboxyl group (including acrylates and methacrylates) and a functional monomer having a functional group that reacts with the hydroxyl group or carboxyl group.

Examples of the unsaturated monomer having a self-crosslinking functional group include the following: monomers containing a methylol group such as N-methylol methacrylamide, N-methylol acrylamide, N-butylol methacrylamide, and N-butylol acrylamide; monomers containing an epoxy group such as allyl glycidyl ether and glycidyl(meta) acrylate; monomers containing an alkoxy-alkyl group such as methoxymethyl(meta) acrylate, ethoxymethyl(meta) acrylate, methoxyethyl(meta) acrylate, and butoxyethyl(meta) acrylate; acetoacetoxyalkyl(meta) acrylate derivatives such as 2-acetoacetoxyethyl(meta) acrylate, 3-acetoacetoxypropyl(meta) acrylate, and 4-acetoacetoxybutyl(meta) acrylate; vinyl monomers having a hydrolysable silyl group such as vinyl trimethoxysilane, vinyl methoxydimethylsilane, vinyl trichlorosilane, and allyl trichlorosilane; and monomers containing an aziridinyl group such as 2-(1-aziridinyl)ethyl(meta) acrylate. In the present specification, the "(meta) acrylate" means both acrylate and methacrylate.

Examples of the monomer having a functional group such as a hydroxyl group or carboxyl group include the following: a (meta)acrylic acid; a crotonic acid; an itaconic acid; a maleic acid; a maleic anhydride; a fumaric acid; β-hydroxyethyl(meta) acrylate; β-hydroxypropyl(meta) acrylate, and β-hydroxyethylvinyl ether. Examples of the functional monomer having a functional group that reacts with the hydroxyl group or carboxyl group include the following: monomers containing an N-methylol group such as N-methylol acrylamide and N-butoxymethyl acrylamide; monomers containing an amino group such as dimethylaminoethyl (meta) acrylate and dimethylaminopropyl acrylamide; and monomers containing an epoxy group such as glycidyl (meta) acrylate.

Among the above self-crosslinking (meta)acrylic acid copolymers, the acrylic acid copolymer that has a low Tg and includes butyl acrylate as the main component of the monomer is particularly suitable.

In addition to the above specific examples of the binder, a known resin may be mixed with an amine compound or a polyacrylic resin to enhance the flexibility or reduce the Tg of the binder. Moreover, a known plasticizer (phthalate esters etc.) may be added to improve the breaking strength of the binder as an additive for imparting flexibility to the binder. Further, the adhesion properties of the binder can be improved by introducing a carboxyl group. The Tg of the resin can be increased by a known method of introducing a crosslinked structure to increase the crosslink density or a rigid molecular structure (an aryl group etc.). The Tg of the resin can be reduced by a known method of introducing a crosslinked structure with a low crosslink density or a long side chain.

The content of the binder in the slurry is preferably 1 or more, more preferably 5 or more, and further preferably 10 or more per 100 of the insulating fine particles when expressed as a volume ratio so as to provide the effect of the binder more effectively. If the content of the binder in the slurry is too large, the ion permeability of the insulating layer is reduced because the pores are filled, which may adversely affect the properties of the electrochemical device. Therefore, the content of the binder is preferably 30 or less, and more preferably 20 or less per 100 of the insulating fine particles when expressed as a volume ratio.

The dispersion medium of the slurry may include water as the main component or an organic solvent (e.g., aromatic hydrocarbons such as toluene, furans such as tetrahydrofuran, and ketones such as methyl ethyl ketone and methyl isobutyl ketone). However, the dispersion medium including water as the main component is suitable. In the context of the present invention, the "dispersion medium" indicates a portion of the slurry other than the solids that remain after the drying process to form the insulating layer. Moreover, the dispersion medium "including water as the main component" means that the amount of water is 70 mass % or more, and preferably 90 mass % or more of the components of the dispersion medium. When the water is the main component, the remaining component of the dispersion medium can be, e.g., alcohols that are to be added to control the surface tension of the slurry (as will be described later). In view of environmental protection, it is particularly preferable that the dispersion medium includes only water.

The viscosity of the slurry is 5 mPa·s or more, preferably 10 mPa·s or more, and more preferably 20 mPa·s or more so as to suppress the sedimentation of the insulating fine particles and improve the dispersion stability. If the viscosity of the slurry is too high, it is difficult to apply the slurry uniformly in a required thickness. Therefore, the viscosity of the slurry is 500 mPa·s or less, preferably 300 mPa·s or less, and more preferably 200 mPa·s or less. In the present invention, the viscosity of the slurry is measured with an E-type viscometer by a method according to the Japanese Industrial Standard (JIS) R 1653 under the conditions of a temperature of 23° C. and a shear rate of 1000/s.

In the slurry, when the thickening agent is, e.g., the natural polysaccharides or the like, the thickening agent may be decomposed by bacteria in the air. Therefore, a preservative or a germicide may be appropriately added to the slurry to suppress the decomposition of the thickening agent. This can improve the storage properties of the slurry including the natural polysaccharides. Specific examples of the preservative or the germicide include the following: a benzoic acid; a p-hydroxybenzoic acid ester; alcohols (such as ethanol and methanol); chlorines (such as sodium hypochlorite); hydrogen peroxide; acids (such as a boric acid and an acetic acid); and alkalis (such as sodium hydroxide and potassium hydroxide).

If the slurry is likely to produce bubbles that may affect the application of the slurry, an antifoaming agent can be used. Various types of antifoaming agents such as mineral oil, silicon, acrylic, and polyether are available. Specific examples of the antifoaming agent include the following: "FOAMLEX (trade name)" manufactured by NICCA CHEMICAL CO., LTD; "SURFYNOL (trade name) series" manufactured by Nisshin Chemical Industry Co., Ltd; "Awazeron (trade name) series" manufactured by Ebara Engineering Service Co., Ltd.; and "SN-Defoamer (trade name) series" manufactured by SAN NOPCO LIMITED.

Moreover, an additive may be added to the slurry to control the surface tension. When the dispersion medium is an organic solvent, the additive can be ethylene glycol, propylene glycol, or various propylene oxide glycol ethers such as monomethyl acetate. When the dispersion medium is water, alcohols (such as methyl alcohol, ethyl alcohol, isopropyl alcohol, and ethylene glycol) can be used to control the surface tension.

It is preferable that the solid content including the insulating fine particles, the thickening agent, the dispersing agent, the binder, and thermofusible fine particles (as will be described later) in the slurry is, e.g., 10 to 80 mass %.

The slurry may be prepared by a conventionally known method. For example, the above materials (such as the insulating fine particles, the thickening agent, the dispersing agent, the binder, the preservative, the germicide, the antifoaming agent, and the thermofusible fine particles (as will be described later)) are dispersed in the dispersion medium using various types of commercially available dispersing devices, thereby preparing the slurry for forming an insulating layer. Some of these materials may be dissolved in the dispersion medium. When the dispersing device generates strong shear, the molecular chains of polymeric materials such as the thickening agent and the binder may be cleaved. To prevent this, it is desirable that the slurry is prepared in the following manner. First, the insulating fine particles and, if necessary, the dispersing agent or the like are dispersed in the dispersion medium with a high-shear dispersing device. Subsequently, the thickening agent, the binder, etc. are added to the dispersion medium and dispersed with a low-shear dispersing device (e.g., a propeller stirrer).

Specific examples of the dispersing device include the following: dispersing devices using a grinding medium such as a bead mill, a ball mill, a planetary mill, and a sand mill; and dispersing devices using no grinding medium such as a jet mill, a rod mill, a nanomizer, and a homogenizer.

Embodiment 2

Next, an embodiment of a separator for an electrochemical device of the present invention will be described. The separator for an electrochemical device of the present invention includes a porous insulating layer. The insulating layer includes heat-resistant insulating fine particles and a binder. The proportion of particles with a particle size of 1 μm or less in the insulating fine particles is 30 vol % or more and the proportion of particles with a particle size of 3 μm or more in the insulating fine particles is 10 vol % or less.

More specifically, the separator includes the insulating layer that has both ion permeability and heat resistance and is formed by the steps of applying the slurry for forming an insulating layer of the present invention, as described in Embodiment 1, to at least one base selected from the group consisting of a positive electrode for an electrochemical device, a negative electrode for an electrochemical device, and a porous base material; and drying the base.

In the present specification, the "heat-resistant insulating layer" means that the insulating layer has a heat resistant temperature of 150° C. or more and is not substantially deformed at at least 150° C. Specifically, when the insulating layer is heated at 150° C., no thermal shrinkage is found by visual observation.

When the porous base material is used as a base to which the slurry is applied, the resultant separator can have a structure in which the insulating layer and the porous base material constitute separate layers, and these layers are integrated together, or a structure in which the components of the slurry and the porous base material are integrated into the insulating layer. Moreover, the separator may include another porous layer as well as the integrated layer of the insulating layer and the porous base material. In this case, the porous layer may be combined with the integrated layer. Alternatively, the porous layer may be independent of the integrated layer, and the separator may be formed by laminating these layers in the electrochemical device.

On the other hand, when the positive electrode or the negative electrode is used as a base to which the slurry is applied, the insulating layer is integrated with at least one of the positive electrode and the negative electrode. In this case, the separator may include either the insulating layer alone or the insulating layer and another porous layer. When the separator is composed of the insulating layer and the porous layer, the porous layer may be combined with the insulating layer. Alternatively, the porous layer may be independent of the insulating layer, and the separator may be formed by laminating these layers in the electrochemical device.

The above positive and negative electrodes for the electrochemical device are to constitute the electrochemical device of the present invention such as a lithium secondary battery as will be described later.

The porous base material is not particularly limited as long as it has electrical insulation and is stable to both an electrochemical reaction inside the electrochemical device and the electrolyte, but is preferably a woven fabric, a nonwoven fabric, or a microporous film. The microporous film may have the same structure as that of the microporous film used for the separator of a general lithium secondary battery.

Specific examples of the components of the porous base material include the following: resins such as cellulose, a modified product of the cellulose (such as carboxymethyl cellulose), polyolefins (such as polypropylene (PP), polyethylene (PE), and a copolymerized polyolefin in which the structural unit derived from ethylene is 85 mol % or more), polyesters (such as polyethylene terephthalate (PET), polyethylene naphthalate (PEN), and polybutylene terephthalate (PBT)), polyacrylonitrile (PAN), aramid, polyamide-imide, and polyimide; and inorganic materials (inorganic oxides) such as glass, alumina, and silica. The copolymerized polyolefin may be, e.g., an ethylene-vinyl monomer copolymer, and specifically an ethylene-vinyl acetate copolymer (EVA), an ethylene-methyl acrylate copolymer, or an ethylene-ethyl acrylate copolymer. The porous base material may include either one type or more than one type of these components. The porous base material also may include various types of known additives (e.g., an antioxidant when the resin is used) as needed in addition to the above components.

In the case where the heat resistance of the separator including the porous base material is of especial importance, it is preferable that the porous base material includes the components with higher heat resistance in those listed above (i.e., the heat-resistant resins such as polyesters, aramid, polyamide-imide, and polyimide and the inorganic materials).

On the other hand, when the temperature of the electrochemical device is higher, the porous base material melts and fills the pores of the separator to retard the ion conduction, thereby ensuring the safety of the electrochemical device. That is, the porous base material serves to impart a so-called shutdown function to the separator. Therefore, the porous base material preferably includes a component that melts and softens at a predetermined temperature. The temperature at which the resin constituting the porous base material melts and softens is in the range of preferably 80° C., more preferably 100° C. to preferably 150° C., more preferably 140° C. This temperature can be determined by a melting temperature that is measured with a differential scanning calorimeter (DSC) according to the regulations of JIS K 7121 (which is true for the thermofusible fine particles, as will be described later). Such a component is preferably polyolefins, and more preferably PE. To provide a better shutdown function, it is particularly preferable that a microporous film made of PE or a laminated microporous film having 2 to 5 layers of PE and PP is used to form the separator.

When the porous base material includes both a thermoplastic resin with a melting point of 80° C. to 150° C. such as PE and a thermoplastic resin with a melting point of higher than 150° C. such as PP (e.g., the porous base material can be a microporous film obtained by mixing PE and a resin (such as PP) with a higher melting point than that of PE, or a laminated microporous film obtained by laminating a PE layer and a resin layer (such as a PP layer) made of a resin with a higher melting point than that of PE), the resin (e.g., PE) with a melting point of 80° C. to 150° C. is preferably 30 mass % or more, and more preferably 50 mass % or more of the thermoplastic resin constituting the porous base material.

The porous base material may be surface-treated, e.g., with ultraviolet irradiation, corona discharge, a plasma treatment, or a surface-active agent to improve the adhesion to the insulating fine particles. When the wettability of the surface of the porous base material with the slurry is improved, the slurry can be applied more uniformly, so that the insulating layer having higher homogeneity and excellent heat resistance can be easily formed. It is desirable that the surface treatment is performed only on the surface portion of the porous base material. In other words, low wettability of the inner surface of the pores of the porous base material with the slurry is better. If the inner surface of the pores of the porous base material is not subjected to the above treatment, the slurry is not likely to enter the pores of the porous base material. Thus, the slurry or the dispersion medium of the slurry can be prevented from passing through the pores to the opposite side of the porous base material from the surface to which the slurry is applied.

For example, the critical surface tension (B) of the surface-treated porous base material is preferably the same as or larger than the surface tension (A) of the slurry at room temperature. The difference [(A)–(B)] is preferably 0 mN/m or less, and more preferably –10 mN/m or less.

The surface tension and the critical surface tension may be measured by a conventionally known method. For the slurry, the surface tension can be measured, e.g., by a plate method, a pendant-drop method, or a maximum bubble pressure method. For the porous base material, the critical surface tension can be measured in the following manner. Using several types of liquids of known surface tensions, a contact angle ($\theta$) between the porous base material and each of the liquids is measured. Then, $\cos \theta$ is plotted against the surface tensions, and the critical surface tension is determined from the point at which cos θ=1.

Although the porous base material with a critical surface tension (B') of 18.5 mN/m or more before the surface treatment is generally used, the critical surface tension is preferably 50 mN/m or less. For example, in the case of the microporous film including polyolefin as the main component, the critical surface tension (B') before the surface treatment is about 31 mN/m for polyethylene and about 29 mN/m for polypropylene at room temperature. These critical surface tensions may be adjusted to a desired critical surface tension (B) by the surface treatment of the porous base material.

The surface treatment conditions of the porous base material can vary depending on the apparatus to be used, the critical surface tension (B') of the porous base material before the surface treatment, and the surface tension (A) of the slurry. For example, when the surface treatment is performed using a metal electrode and a corona treatment apparatus manufactured by KASUGA ELECTRIC WORKS LTD., the amount of discharge is preferably 25 to 100 W/min·m².

When the porous base material is a woven or nonwoven fabric, it is composed of fibers. In this case, the fiber diameter may be not more than the thickness of the separator. Specifically, the fiber diameter is preferably 0.01 to 5 µm. If the fiber diameter is too large, entanglement of the fibers is insufficient, and the strength of the porous base material composed of these fibers is reduced. This can reduce the strength of the separator and make it difficult to handle the separator. If the fiber diameter is too small, the pores of the separator become excessively small. Therefore, the ion permeability tends to be low, and the load characteristics of the electrochemical device can be degraded.

The woven or nonwoven fabric may use a binder as needed in order to bind the fibers. The binder can be any of the various types of binders included in the insulating layer (i.e., the slurry), as described above.

If the porous base material is composed of fibers such as a woven or nonwoven fabric, and in particular the pore diameter of the porous base material is relatively large (e.g., 5 µm or more), this tends to cause a short circuit of the electrochemical device. In such a case, therefore, it is preferable that a part or the whole of the insulating fine particles is contained in the pores of the porous base material. It is more preferable that a part or the whole of the fine particles other than the insulating fine particles (such as the thermofusible fine particles as will be described later) is contained in the pores of the porous base material. With this configuration, the effect of the fine particles other than the insulating fine particles (i.e., the shutdown function when the thermofusible fine particles are used) can be more effectively achieved. The insulating fine particles or the thermofusible fine particles can be present in the pores of the porous base material, e.g., by impregnating the slurry into the porous base material, allowing the porous base material to pass through a predetermined gap to remove the extra slurry, and subsequently drying the porous base material.

The nonwoven fabric and the microporous film are more preferred as the porous base material used for the separator of the present invention because the thickness can be reduced. The nonwoven fabric and the microporous film may be produced by a conventionally known method. Specifically, the nonwoven fabric can be produced, e.g., by a spun-bond method, a melt-blow method, a wet process, a dry process, or an electrospinning process. The microporous film can be produced, e.g., by a foaming process, a solvent extraction process, a dry drawing process, or a wet drawing process.

The separator also can have the shutdown function in such a manner that a material for imparting the shutdown function is included in the insulating layer, or that a layer for imparting the shutdown function is provided in the separator. In particular, when the porous base material includes a resin having high heat resistance, or the separator is formed without using the porous base material, the following methods are recommended to ensure the shutdown function of the separator.

As described above, the separator may have a structure that includes the integrated layer (of the insulating layer and the porous base material) and another porous layer, or a structure that includes the insulating layer and another porous layer. The layer for imparting the shutdown function to the separator corresponds to this "another porous layer". The "another porous layer" may be, e.g., a porous base material (more preferably a microporous film) including the component that melts and softens at a predetermined temperature, as described above.

The layer (particularly the microporous film) for imparting the shutdown function is likely to cause thermal shrinkage at high temperatures. However, in the separator of the present invention, the insulating layer including the insulating fine particles acts to suppress thermal shrinkage of the whole separator and thus can improve the dimensional stability of the separator at high temperatures. Even if the separator does not include a layer for imparting the shutdown function separately, the thermal shrinkage of the separator can be suppressed due to the effect of the insulating fine particles of the insulating layer. Therefore, the electrochemical device using the separator of the present invention can suppress an internal short circuit caused by shrinkage of the separator at high temperatures and improve both reliability and safety.

The material for imparting the shutdown function that is added to the insulating layer can be, e.g., thermofusible fine particles that melt and soften when the temperature of the electrochemical device is raised.

The temperature at which the thermofusible fine particles melt and soften is in the range of preferably 80° C., more preferably 100° C. to preferably 150° C., more preferably 140° C. Specific examples of the components of the thermofusible fine particles include the following: PE; a copolymerized polyolefin in which the structural unit derived from ethylene is 85 mol % or more; PP; polyolefin derivatives (such as chlorinated polyethylene and chlorinated polypropylene); a polyolefin wax; a petroleum wax; and a carnauba wax. The copolymerized polyolefin may be, e.g., an ethylene-vinyl monomer copolymer, and specifically EVA, an ethylene-methyl acrylate copolymer, or an ethylene-ethyl acrylate copolymer. Moreover, polycycloolefin etc. also can be used. The thermofusible fine particles may include either one type or more than one type of these components. Among the above components, the PE, the polyolefin wax, or the EVA in which the structural unit derived from ethylene is 85 mol % or more is suitable. The thermofusible fine particles also may include various types of known additives (e.g., an antioxidant when the resin is used) as needed in addition to the above components.

The particle size of the thermofusible fine particles is, e.g., in the range of preferably 0.01 µm, more preferably 0.1 µm to preferably 15 µm, more preferably 1 µm when expressed as a number-average particle size that is measured by the same measurement method as that of the insulating fine particles.

The shutdown function of the separator can be evaluated, e.g., by an increase in resistance with the temperature of a model cell. The model cell including a positive electrode, a negative electrode, a separator, and an electrolyte is prepared. Then, this model cell is placed in a thermostatic bath, and the internal resistance value of the model cell is measured while the temperature is raised at 5° C./min. By determining the temperature at which the measured internal resistance value is at least five times as large as that before heating (i.e., the resistance value measured at room temperature), this temperature can be evaluated as a shutdown temperature of the separator.

The separator may have a plurality of insulating layers or a plurality of layers composed of the porous base material. For example, the separator may be formed by disposing the microporous films on both sides of the insulating layer or disposing the insulating layers on both sides of the microporous film. However, the thickness of the separator increases with the number of layers, which may lead to an increase in the internal resistance or a reduction in the energy density of the electrochemical device. Therefore, the number of layers in the separator is preferably five layers or less.

The content of the insulating fine particles in the separator is preferably 10 vol % or more, more preferably 30 vol % or more, and further preferably 40 vol % or more of the total volume of components in the separator so as to provide the effect of the insulating fine particles more effectively.

For example, in the case where the insulating layer is formed on the electrode surface without using the porous base material, and the separator also includes the thermofusible fine particles to have the shutdown function, the volume ratio of the insulating fine particles in the separator is preferably 80 vol % or less. On the other hand, when the separator neither includes the porous base material nor has the shutdown function, the volume ratio of the insulating fine particles in the separator can be even higher as long as it is, e.g., 95 vol % or less.

In the case where the separator uses the porous base material and also includes the thermofusible fine particles in the insulating layer to have the shutdown function, or the separator is composed of the porous base material (e.g., the microporous film) including a thermofusible resin and the insulating layer, the volume ratio of the insulating fine particles in the separator is preferably 60 vol % or less. On the other hand, when the separator uses the porous base material, but does not require the shutdown function, the volume ratio of the insulating fine particles in the separator can be even higher and is preferably 80 vol % or less.

In view of ensuring a good shutdown function of the separator, the content of the thermofusible resin (i.e., the porous base material including the thermofusible resin or the thermofusible fine particles) in the separator is preferably 5 to 70 vol % of the total volume of components in the separator. If the content of the thermofusible resin in the separator is too small, the shutdown effect obtained by this resin can be reduced. If the content of the thermofusible resin is too large, the content of the insulating fine particles or the like in the separator is reduced, and thus the effects of these components can be reduced.

Therefore, it is preferable that the slurry for forming an insulating layer of the present invention includes the above components in amount such that the content of each of the components in the resultant insulating layer can meet the appropriate value.

In view of further improving the effect of preventing a short circuit in the electrochemical device and ensuring the strength of the separator to achieve better handling, the thickness of the separator is preferably 3 μm or more, and more preferably 5 μm or more. On the other hand, in view of further improving the energy density of the electrochemical device, the thickness of the separator is preferably 50 μm or less, and more preferably 30 μm or less. When the separator includes the insulating layer alone, the thickness of the insulating layer may meet the appropriate thickness of the separator.

For example, when the separator includes the insulating layer and the porous base material as separate layers (in particular, the porous base material is a microporous film), it is preferable that the ratio of X and Y (Y/X) is 1 to 10, where X represents the thickness (μm) of the insulating layer and Y represents the thickness (μm) of the porous base material, and that the thickness of the whole separator meets the above appropriate value. If Y/X is too large, the insulating layer is excessively thin. As a result, e.g., when the dimensional stability of the porous base material at high temperature is poor, the effect of suppressing thermal shrinkage of the porous base material can be reduced. If Y/X is too small, the insulating layer is excessively thick. Therefore, the thickness of the whole separator is increased, and the load characteristics or the like of the electrochemical device can be degraded. When the separator has a plurality of insulating layers, X represents the total thickness of the plurality of insulating layers. When the separator has a plurality of porous base materials, Y represents the total thickness of the plurality of porous base materials.

Specifically, the thickness of the porous base material (i.e., the total thickness when the separator has a plurality of porous base materials) is preferably in the range of 5 μm to 30 μm. The thickness of the insulating layer (i.e., the total thickness when the separator has a plurality of insulating layers) is in the range of preferably 1 μm, more preferably 2 μm, further preferably 4 μm to preferably 20 μm, more preferably 10 μm, and further preferably 6 μm.

To improve the ion permeability by ensuring the retention of the electrolyte, the porosity of the separator is preferably 20% or more, and more preferably 30% or more in a dry state. On the other hand, in view of ensuring the strength of the separator and preventing an internal short circuit, the porosity of the separator is preferably 70% or less, and more preferably 60% or less in a dry state. The porosity P (%) of the separator can be calculated from the thickness of the separator, the mass per unit area of the separator, and the densities of the components of the separator by obtaining a summation for each component i with the following formula.

$$P = \Sigma a_i \rho_i/(m/t)$$

where $a_i$ represents the ratio of a component i expressed as a mass percentage, $\rho_i$ represents the density (g/cm$^3$) of the component i, m represents the mass (g/cm$^2$) per unit area of the separator, and t represents the thickness (cm) of the separator.

It is desirable that the separator of the present invention has an air permeability of 10 to 300 sec, which is indicated by a Gurley value. The Gurley value is obtained by a method according to JIS P 8117 and expressed as the length of time (seconds) it takes for 100 ml air to pass through a membrane at a pressure of 0.879 g/mm$^2$. If the air permeability is too large, the ion permeability can be reduced. If the air permeability is too small, the strength of the separator can be reduced. The air permeability can be ensured by the separator with the configuration as described above.

Next, a method for producing a separator for an electrochemical device of the present invention will be described. This method includes the steps of applying the slurry for forming an insulating layer of the present invention, as described in Embodiment 1, to at least one base selected from a positive electrode, a negative electrode, and a porous base material; and drying the base to which the slurry is applied.

The slurry may be applied to the surface of the base with a conventionally known coating apparatus such as a die coater, a gravure coater, a reverse roll coater, a squeeze roll coater, a curtain coater, a blade coater, or a knife coater.

FIG. 1 is a schematic view showing an example of the coating apparatus that is applicable to the production of the separator of the present invention. The coating apparatus shown in FIG. 1 includes a corona discharge device 2 for performing a surface treatment on a porous base material 1 before the slurry is applied.

When the separator of the present invention is produced by using the coating apparatus shown in FIG. 1, first, the rein porous base material 1 that has been wound up into a roll is drawn out and then surface-treated with corona discharge 2a by the corona discharge device 2. Subsequently, the slurry for forming an insulating layer is applied to the surface of the porous base material 1 after the surface treatment by a die head 3. Since the surface treatment is performed only on the surface portion of the porous base material 1, the slurry or the dispersion medium of the slurry can be prevented from entering the pores of the porous base material 1. This can prevent the contamination of the surface of a back roll 4 that is located on the opposite side of the porous base material from the surface to which the slurry is applied, or the contamination of the surface of a turn roll 5 that feeds the porous base material 1 after the application of the slurry. Thus, the slurry can be applied more uniformly, so that the homogeneity of the insulating layer can be improved.

The coating film formed on the surface of the porous base material 1 is dried with dry air 6a or the like in a dry zone 6. Consequently, the separator including the resin porous film and the heat-resistant porous layer is produced. FIG. 1 shows an example of producing the separator in which the heat-resistant porous insulating layer is formed on one side of the resin porous base material 1. In the separator of the present invention, however, the insulating layer may be formed on either one side or both sides of the porous base material. Moreover, the separator may include a plurality of porous base materials.

In FIG. 1, the process of surface-treating the porous base material and the process of forming the insulating layer by applying the slurry to the surface-treated porous base material are continuously performed. However, these processes may be independently performed.

When the insulating fine particles are in the form of plate-like particles, the orientation of the plate-like insulating fine particles in the separator may be improved by subjecting the slurry to shear while it is applied to the base material. For example, in the case where the porous base material is used to produce the separator, the slurry may be subjected to shear by impregnating the slurry into the porous base material, allowing the porous base material to pass through a predetermined gap to remove the extra slurry, and subsequently drying the porous base material.

In addition to the above shearing, the orientation of the plate-like insulating fine particles in the separator can be further improved, e.g., by the following methods: a method of using a slurry that has a high solid concentration (e.g., 50 to 80 mass %); a method of using a slurry that is prepared by dispersing the insulating fine particles in a solvent with various types of mixing and stirring devices such as a disperser, an agitator, a homogenizer, a ball mill, an attritor, and a jet mill and mixing a binder (and the thermofusible fine particles as needed) with the dispersion thus obtained; a method of using a slurry that includes the insulating fine particles whose surfaces have been modified by the action of dispersing agents such as fats and oils, a surface-active agent, and a silane coupling agent; a method of using a slurry that includes the insulating fine particles with different shapes, diameters, or aspect ratios; a method of controlling the dry conditions after the slurry is applied to the porous base material; a method of pressing the separator by applying pressure or applying heat and pressure; and a method of applying a magnetic field to the base material after the application of the slurry and before drying. These methods may be performed individually or in combinations of two or more.

In the production method of the present invention, the slurry of the present invention that has good dispersion stability of the insulating fine particles is used to form the insulating layer of the separator. Therefore, according to the production method of the present invention, the separator including the insulating layer with high homogeneity can be produced, e.g., even if the slurry used has been stored for a long time. Moreover, according to the production method of the present invention, even if a long separator is continuously produced, the separator can include the insulating layer with high homogeneity from the beginning to the end of the production and thus have stable quality.

Embodiment 3

Next, an electrochemical device of the present invention will be described. The electrochemical device of the present invention includes the separator of the present invention having good heat resistance, as described in Embodiment 2. Therefore, even if the temperature in the electrochemical device becomes high, it is possible to suppress an internal short circuit caused by thermal shrinkage of the separator. Moreover, it is also possible to suppress a small short circuit caused by a deposition of the lithium dendrite by the separator. Thus, electrochemical device can achieve excellent safety and reliability.

The intended use of the electrochemical device of the present invention is not particularly limited. The electrochemical device can be suitably used in any application requiring safety at high temperatures such as a lithium battery (primary and secondary batteries) including an organic electrolyte or a super capacitor. There is no particular limitation to the configuration/structure of the electrochemical device as long as it includes the separator of the present invention. Accordingly, the electrochemical device of the present invention can employ various configurations/structures of various types of conventionally known electrochemical devices including an organic electrolyte (such as a lithium secondary battery, a lithium primary battery, and a super capacitor).

Hereinafter, as an example of the electrochemical device of the present invention, a lithium secondary battery that includes a positive electrode, a negative electrode, a separator interposed between the positive electrode and the negative electrode, and an electrolyte will be described in detail. The lithium secondary battery may be in the form of a rectangular or circular cylinder and have an outer can made of steel or aluminum. Moreover, the lithium secondary battery may be a soft package battery using a metal-deposited laminated film as an outer package.

The positive electrode is not particularly limited as long as it has been used for a conventional lithium secondary battery, that is, it contains an active material capable of intercalating and deintercalating a Li ion. Examples of the positive active material include the following; a lithium-containing transition metal oxide expressed as $Li_{1+x}MO_2$ ($-0.1<x<0.1$, M: Co, Ni, Mn, Mg, Al, Zr, Ti, etc.); a lithium manganese oxide such as $LiMn_2O_4$; $LiMn_xM_{(1-x)}O_2$ in which a part of Mn of $LiMn_2O_4$ is substituted with another element; an olivine-type $LiMPO_4$ (M: Co, Ni, Mn, Fe); $LiMn_{0.5}Ni_{0.5}O_2$; and $Li_{(1+a)}Mn_xCo_yNi_{(1-x-y)}O_2$ ($-0.1<a<0.1$, $0<x<0.5$, $0<y<0.5$). The positive electrode may be produced in such a manner that a positive electrode mixture is prepared by adding a known conductive assistant (e.g., a carbon material such as carbon black) or a binder such as polyvinylidene fluoride (PVDF) appropriately to the above positive active materials, and then is formed into a compact (i.e., a positive electrode mixture layer) by using a current collector as a core material.

The current collector of the positive electrode may be, e.g., a foil, a punched metal, a mesh, or an expanded metal, which are made of aluminum or the like. In general, an aluminum foil with a thickness of 10 to 30 μm can be suitably used.

A lead portion of the positive electrode is generally provided in the following manner. A part of the current collector remains exposed without forming the positive electrode mixture layer when the positive electrode is produced, and this exposed portion can serve as the lead portion. However, the lead portion does not necessarily need to be integrated with the current collector from the beginning and may be provided by connecting an aluminum foil or the like to the current collector afterward.

The negative electrode is not particularly limited as long as it has been used for a conventional lithium secondary battery, that is, it contains an active material capable of intercalating and deintercalating a Li ion. Examples of the negative active material include one type of carbon materials capable of intercalating and deintercalating lithium such as graphite, pyrolytic carbons, coke, glassy carbons, a calcined organic polymer compound, mesocarbon microbeads (MCMB), and a carbon fiber or a mixture of two or more types of the carbon materials. Moreover, examples of the negative active material also include the following: elements such as Si, Sn, Ge, Bi, Sb, and In and their alloys; compounds that can be charged/discharged at a low voltage close to a lithium metal such as a lithium-containing nitride; a lithium metal; and a lithium/aluminum alloy. The negative electrode may be produced in such a manner that a negative electrode mixture is prepared by adding the conductive assistant (e.g., a carbon material such as carbon black) or the binder (e.g., PVDF) appropriately to the above negative active materials, and then formed into a compact (i.e., a negative electrode mixture layer) by using a current collector as a core material. Moreover, a foil of the lithium metal or various alloys as described above can be used individually as the negative electrode. Alternatively, a negative electrode layer may be formed by laminating a layer of the lithium metal or various alloys as described above and the current collector.

When the negative electrode includes the current collector, the current collector may be, e.g., a foil, a punched metal, a mesh, or an expanded metal, which are made of copper or nickel. In general, a cooper foil is used. If the thickness of the whole negative electrode is reduced to achieve a battery with high energy density, the current collector of the negative electrode preferably has a thickness of 5 to 30 μm.

Similarly to the lead portion of the positive electrode, a lead portion of the negative electrode is generally provided in the following manner. A part of the current collector remains exposed without forming the negative electrode layer (including the negative active material layer and the negative electrode mixture layer) when the negative electrode is produced, and this exposed portion can serve as the lead portion. However, the lead portion does not necessarily need to be integrated with the current collector from the beginning and may be provided by connecting a copper foil or the like to the current collector afterward.

The positive electrode and the negative electrode may be used in the form of an electrode assembly having a stacked structure in which these electrodes are stacked via the separator of the present invention, or in the form of an electrode assembly having a wound structure in which the electrode assembly having the stacked structure is wound.

The electrolyte (organic electrolyte) may be a solution obtained by dissolving a lithium salt in an organic solvent. The lithium salt is not particularly limited as long as it dissociates in the solvent to produce a $Li^+$ ion and does not cause a side reaction such as decomposition in the working voltage range of a battery. Examples of the lithium salt include the following: inorganic lithium salts such as $LiClO_4$, $LiPF_6$, $LiBF_4$, $LiAsF_6$, and $LiSbF_6$; and organic lithium salts such as $LiCF_3SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 5$), and $LiN(RfOSO_2)_2$ (where Rf represents a fluoroalkyl group).

The organic solvent used for the electrolyte is not particularly limited as long as it dissolves the lithium salt and does not cause a side reaction such as decomposition in the working voltage range of a battery. Examples of the organic solvent include the following: cyclic carbonates such as an ethylene carbonate, a propylene carbonate, a butylene carbonate, and a vinylene carbonate; chain carbonates such as a dimethyl carbonate, a diethyl carbonate, and a methyl ethyl carbonate; chain esters such as methyl propionate; cyclic esters such as γ-butyrolactone; chain ethers such as dimethoxyethane, diethyl ether, 1,3-dioxolane, diglyme, triglyme, and tetraglyme; cyclic ethers such as dioxane, tetrahydrofuran, and 2-methyltetrahydrofuran; nitriles such as acetonitrile, propionitrile, and methoxypropionitrile; and sulfurous esters such as ethylene glycol sulfite. The above examples of the organic solvent may be used individually or in combinations of two or more. A combination of the materials capable of achieving a high conductivity, e.g., a mixed solvent of the ethylene carbonate and the chain carbonate is preferred for better characteristics of the battery. Moreover, to improve the safety, the charge-discharge cycle characteristics, the high-temperature storage characteristics, or the like, additives such as vinylene carbonates, 1,3-propane sultone, diphenyl disulfide, cyclohexylbenzene, biphenyl, fluorobenzene, and t-butylbenzene can be appropriately added to the electrolyte.

The concentration of the lithium salt in the electrolyte is preferably 0.5 to 1.5 mol/l, and more preferably 0.9 to 1.25 mol/l.

Instead of the organic solvent, room temperature molten salts such as ethyl-methylimidazolium trifluoromethyl sulfonium imide, heptyl-trimethylammonium trifluoromethyl sulfonium imide, pyridinium trifluoromethyl sulfonium imide, and guadinium trifluoromethyl sulfonium imide also can be used.

Moreover, a polymeric material that contains and gelatinizes the electrolyte may be added, and the gelled electrolyte may be used in the battery. Examples of the polymeric material for gelatinizing the electrolyte include known host polymers capable of forming a gelled electrolyte such as PVDF, a vinylidene fluoride-hexafluoropropylene copolymer (PVDF-HFP), PAN, a polyethylene oxide, a polypropylene oxide, an ethylene oxide-propylene oxide copolymer, a crosslinked polymer having an ethylene oxide chain in the main or side chain, and a crosslinked poly(meta)acrylic ester.

The electrochemical device of the present invention can be used as a power source for various equipment such as portable equipment (a portable telephone, a notebook personal computer, etc.), an electric vehicle, a hybrid vehicle, an electric motorcycle, a power-assisted bicycle, a power tool, and a shaver. In addition to the power source, the electrochemical device of the present invention also can be used for the same applications as those of a conventionally known electrochemical device.

Hereinafter, the present invention will be described in detail based on examples. However, the present invention is not limited to the following examples.

In the following examples, a median diameter (d50) in the volume-based particle size distribution of the insulating fine particles, a 10% value (d10) of the cumulative distribution, a 30% value (d30) of the cumulative distribution, and a 90% value (d90) of the cumulative distribution were determined, and the median diameter was defined as an average particle size of the insulating fine particles. Moreover, it was confirmed from d30 that the proportion of particles with a particle size of 1 μm or less was 30 vol % or more. It was also confirmed from d90 that the proportion of particles with a particle size of 3 μm or more was 10 vol % or less.

Preparation of Slurry for Forming Insulating Layer

Example 1

To 1000 g of plate-like boehmite (insulating fine particles) with an aspect ratio of 10 were added 1000 g of water (dispersion medium) and 1 part by mass of ammonium polyacrylate (dispersing agent) with respect to 100 parts by mass of boehmite, and then mixed in a bench ball mill for 6 days, so that the plate-like boehmite was dispersed in water. It was confirmed that d10, d30, d50, and d90 of the boehmite in the resultant dispersion were 0.40 μm, 0.68 μm, 0.98 μm, and 1.86 μm, respectively, that the average particle size was 0.98 μm, and that the proportion of particles with a particle size of 1 μm or less was 50 vol % or more and the proportion of particles with a particle size of 3 μm or more was 10 vol % or less.

Next, an emulsion of a self-crosslinking acrylic acid copolymer including butyl acrylate as the main component of the monomer was used as a binder, and 3 parts by mass of the emulsion with respect to 100 parts by mass of boehmite was added to the dispersion. Moreover, 2 g of xanthan gum was added to the dispersion as a thickening agent. This mixture was stirred with a Three-One Motor for 1 hour and dispersed, resulting in a uniform slurry for forming an insulating layer.

The viscosity of the slurry thus obtained was measured with an E-type viscometer at 20° C., and was 200 mPa·s.

The stability of the slurry was evaluated with a Turbiscan ("MA-2000 (trade name)" manufactured by EKO INSTRUMENTS CO., LTD.) by measuring a height of sedimentation in a sample tube. The slurry was injected into the sample tube at a height of 60 mm, and the back scattering light intensity was measured. Then, the height to the point at which the scattered light intensity was 1 or more was measured and defined as the height of sedimentation. In Example 1, the height of sedimentation one week after the start of the measurement was 54 mm.

Example 2

A slurry for forming an insulating layer was produced in the same manner as Example 1 except that polyhedral alumina was used instead of the plate-like boehmite. It was confirmed that d10, d30, d50, and d90 of the alumina dispersed in water were 0.40 μm, 0.47 μm, 0.54 μm, and 1.15 μm, respectively, that the average particle size was 0.54 μm, and that the proportion of particles with a particle size of 1 μm or less was 50 vol % or more and the proportion of particles with a particle size of 3 μm or more was 10 vol % or less. As a result of the measurement of the slurry thus obtained in the same manner as Example 1, the viscosity was 180 mPa·s and the height of sedimentation after one week was 53 mm.

Example 3

A slurry for forming an insulating layer was produced in the same manner as Example 1 except that plate-like alumina with an aspect ratio of 25 was used instead of the plate-like boehmite. It was confirmed that d10, d30, d50, and d90 of the alumina dispersed in water were 0.43 μm, 0.78 μm, 1.05 μm, and 1.20 μm, respectively, that the average particle size was 1.05 μm, and that the proportion of particles with a particle size of 1 μm or less was 30 vol % or more and the proportion of particles with a particle size of 3 μm or more was 10 vol % or less. As a result of the measurement of the slurry thus obtained in the same manner as Example 1, the viscosity was 190 mPa·s and the height of sedimentation after one week was 55 mm.

Example 4

A slurry for forming an insulating layer was produced in the same manner as Example 1 except that boehmite having a second particle structure was used instead of the plate-like boehmite. It was confirmed that d10, d30, d50, and d90 of the boehmite dispersed in water were 0.34 μm, 0.48 μm, 0.71 μm, and 1.24 μm, respectively, that the average particle size was 0.71 μm, and that the proportion of particles with a particle size of 1 μm or less was 50 vol % or more and the proportion of particles with a particle size of 3 μm or more was 10 vol % or less. As a result of the measurement of the slurry thus obtained in the same manner as Example 1, the viscosity was 220 mPa·s and the height of sedimentation after one week was 56 mm.

Example 5

A slurry for forming an insulating layer was produced in the same manner as Example 1 except that polyhedral silica was used instead of the plate-like boehmite, and the amount of the thickening agent was changed to 10 g. It was confirmed that d10, d30, d50, and d90 of the silica dispersed in water were 0.11 μm, 0.16 μm, 0.20 μm, and 0.39 μm, respectively, that the average particle size was 0.20 μm, and that the proportion of particles with a particle size of 1 μm or less was 90 vol % or more and the proportion of particles with a particle size of 3 μm or more was 10 vol % or less.

As a result of the measurement of the slurry thus obtained in the same manner as Example 1, the viscosity was 200 mPa·s and the height of sedimentation after one week was 50 mm.

Example 6

A slurry for forming an insulating layer was produced by further adding 1 g of a p-hydroxybenzoic acid ester (serving as a preservative) to the slurry of Example 1. As a result of the measurement of the slurry thus obtained in the same manner as Example 1, the viscosity and the height of sedimentation after one week were the same as those of the slurry of Example 1.

Example 7

A slurry for forming an insulating layer was produced by further adding 0.1 g of a polyether antifoaming agent (polyether-modified organopolysiloxane) to the slurry of Example 1. As a result of the measurement of the slurry thus obtained in the same manner as Example 1, the viscosity and the height of sedimentation after one week were the same as those of the slurry of Example 1.

Comparative Example 1

A slurry for forming an insulating layer was produced in the same manner as Example 1 except that the thickening agent was not added. As a result of the measurement of the slurry thus obtained in the same manner as Example 1, the viscosity was 3 mPa·s and the height of sedimentation after one week was 34 mm.

Production of Separator 1

Examples 8 to 14

Each of the slurries of Examples 1 to 7 was uniformly stirred and defoamed. Then, a PET nonwoven fabric (porous base material) with a thickness of 15 μm was immersed in and removed from the slurry, so that the slurry was applied to the nonwoven fabric. Subsequently, this nonwoven fabric was allowed to pass through a predetermined gap and dried, thereby providing a separator with a thickness of 20 μm. However, since the slurry of Example 7 included the antifoaming agent, the defoaming treatment was not necessary.

All the slurries of Examples 1 to 7 had high stability and were uniformly applied to the base material continuously for a long time. Therefore, the separators (Examples 8 to 14) including the insulating layer with high homogeneity were provided over a long time by using the slurries of Examples 1 to 7.

On the other hand, when the slurry of Comparative Example 1 that did not include a thickening agent and had a low viscosity was used to produce a separator in the same manner as described above, the separator including the insulating layer with relatively high homogeneity was obtained immediately after the start of the application of the slurry. However, the insulating fine particles were settled in the slurry over time, and the uniform insulating layer was not formed accordingly. Thus, the slurry of Comparative Example 1 was not continuously applied for a long time.

Production of Separator 2

Examples 15 to 21

Each of the slurries of Examples 1 to 7 and Comparative Example 1 was uniformly stirred and defoamed. Then, the slurry was applied to one surface of a PE microporous film (porous base material) with a thickness of 16 μm using a die coater and dried, thereby providing a separator with a thickness of 20 μm. However, since the slurry of Example 7 included the antifoaming agent, the defoaming treatment was not necessary.

All the slurries of Examples 1 to 7 had high stability and were uniformly applied to the base material continuously for a long time. Therefore, the separators (Examples 15 to 21) including the insulating layer with high homogeneity were provided over a long time by using the slurries of Examples 1 to 7.

On the other hand, when the slurry of Comparative Example 1 that did not include a thickening agent and had a low viscosity was used to produce a separator in the same manner as described above, the separator including the insulating layer with relatively high homogeneity was obtained immediately after the start of the application of the slurry. However, the insulating fine particles were settled in the slurry in the die head over time, and some lines appeared on the coating film of the slurry. Thus, the slurry of Comparative Example 1 was not continuously applied for a long time.

<Evaluation of Heat Resistance of Separator>

Each of the slurries of Examples 1 to 7 was applied to the surface of a copper foil using an applicator and dried, thereby forming a porous insulating layer with a thickness of 20 μm. Moreover, the copper foil having the insulating layer was heated at 150° C., and the presence or absence of thermal shrinkage was checked by visual observation. Consequently, no thermal shrinkage of the insulating layer was found.

Next, the heat resistance of the separators of Examples 8 to 21 was evaluated in the following manner. First, two sheets of cardboard with a thickness of 1 mm were prepared, each of which was cut to 9 cm×9 cm and provided with a hole of 3 cm square in the center. Then, a double-faced tape was attached to the four sides around the hole of one sheet, and the separator to be tested was placed at the center of this sheet and bonded. Moreover, the other sheet was disposed on the separator so that the separator was sandwiched between the two sheets and fixed. Subsequently, the separator held between the two sheets of cardboard was hanged in a thermostatic chamber at 150° C. and allowed to stand for 3 hours. Thereafter, the separator was taken out, and the presence or absence of fracture in the separator was observed. For comparison purposes, the PE microporous film (with a thickness of 20 μm) for a lithium secondary battery also evaluated in the same manner.

There was no fracture in the separators of Examples 8 to 21 even after the above test, and the separators showed good heat resistance. In contrast, a fracture was found in the PE microporous film (including only PE) after the test, and it turned out that the PE microporous film had poor heat resistance.

Production of Lithium Secondary Battery

Example 22

A positive electrode mixture containing paste was prepared by mixing 85 parts by mass of $LiCoO_2$ (positive active material), 10 parts by mass of acetylene black (conductive assistant), and 5 parts by mass of PVDF (binder) uniformly by using N-methyl-2-pyrrolidone (NMP) as a solvent. This paste was intermittently applied to both surfaces of an aluminum foil (current collector) with a thickness of 15 μm so that the applied length was 320 mm on the upper surface and 250 mm on the lower surface, which then was dried and calendered. The thicknesses of the positive electrode mixture layers were adjusted so that the total thickness was 150 µm. Subsequently, the current collector having the positive electrode mixture layers was cut into a width of 43 mm, thus producing a positive electrode with a length of 340 mm and a width of 43 mm. Moreover, a lead portion was connected to the exposed portion of the aluminum foil of the positive electrode.

A negative electrode mixture containing paste was prepared by mixing 90 parts by mass of graphite (negative active material) and 5 parts by mass of PVDF (binder) uniformly by using NMP as a solvent. This paste was intermittently applied to both surfaces of a copper foil (current collector) with a thickness of 10 µm so that the applied length was 320 mm on the upper surface and 260 mm on the lower surface, which then was dried and calendered. The thicknesses of the negative electrode mixture layers were adjusted so that the total thickness was 142 µm. Subsequently, the current collector having the negative electrode mixture layers was cut into a width of 45 mm, thus producing a negative electrode with a length of 330 mm and a width of 45 mm. Moreover, a lead portion was connected to the exposed portion of the copper foil of the negative electrode.

The positive electrode and the negative electrode thus obtained were stacked with the separator of Example 8 interposed between them, and then wound in a spiral fashion to form an electrode assembly having a wound structure. The electrode assembly was placed in a cylindrical battery case with a diameter of 14 mm and a height of 50 mm. Subsequently, an electrolyte (i.e., a solution obtained by dissolving $LiPF_6$ at a concentration of 1.2 mol/l in a solvent containing an ethylene carbonate and an ethyl methyl carbonate at a volume ratio of 1:2) was injected into the battery case, and the opening of the battery case was sealed in a usual manner, resulting in a lithium secondary battery.

Examples 23 to 28

Lithium secondary batteries of Examples 23 to 28 were produced in the same manner as Example 22 except that the separators of Examples 9 to 14 were used, respectively.

Examples 29 to 35

Lithium secondary batteries of Examples 29 to 35 were produced in the same manner as Example 22 except that the separators of Examples 15 to 21 were used, respectively, and the separator was interposed between the positive electrode and the negative electrode so that the PE microporous film faced the negative electrode.

Table 1 shows the separator and the slurry for forming an insulating layer used for the lithium secondary battery in each of the examples.

TABLE 1

| Lithium secondary battery | Slurry for forming insulating layer | Separator |
| --- | --- | --- |
| Example 22 | Example 1 | Example 8 |
| Example 23 | Example 2 | Example 9 |
| Example 24 | Example 3 | Example 10 |
| Example 25 | Example 4 | Example 11 |
| Example 26 | Example 5 | Example 12 |
| Example 27 | Example 6 | Example 13 |

TABLE 1-continued

| Lithium secondary battery | Slurry for forming insulating layer | Separator |
| --- | --- | --- |
| Example 28 | Example 7 | Example 14 |
| Example 29 | Example 1 | Example 15 |
| Example 30 | Example 2 | Example 16 |
| Example 31 | Example 3 | Example 17 |
| Example 32 | Example 4 | Example 18 |
| Example 33 | Example 5 | Example 19 |
| Example 34 | Example 6 | Example 20 |
| Example 35 | Example 7 | Example 21 |

<Evaluation of Charge-Discharge Characteristics>

Using the lithium secondary batteries produced in Examples 22 to 35, as a preliminary charge (i.e., a charge during conversion), a constant-current charge was performed at 150 mA until the voltage reached 4.2 V so that the electrical quantity was 20% of a rated capacity of 750 mAh of the battery, and subsequently a constant-voltage charge was performed at 4.2 V. The total charge time of the constant-current charge and the constant-voltage charge was 6 hours. Moreover, a constant-current discharge was performed on the charged battery at 150 mA until the voltage was reduced to 3 V. In this manner, a conversion treatment of the battery was performed.

Next, the lithium secondary batteries of Examples 22 to 35 after the conversion treatment were charged by performing a constant-current charge at 150 mA to 4.2 V and a constant-voltage charge at 4.2 V for 15 hours in total, and then discharged at 150 mA until the voltage was reduced to 3V. Consequently, all the batteries of Examples 22 to 35 achieved the discharge capacity comparable to the rated capacity. In this case, the ratio of the discharge capacity to the charge capacity was approximately 100% in each of the batteries. Thus, it was confirmed that these batteries had good charge-discharge characteristics and reliability.

Since the self-crosslinking acrylic resin was used as a binder added to the slurry for forming an insulating layer, the flexibility of the insulating layer (separator) formed of the slurry was improved. Therefore, it was possible to suppress cracking of the separator or peeling of the insulating fine particles in the innermost portion of the electrode assembly having a wound structure. Thus, a small short circuit caused by a deposition of the lithium dendrite could be sufficiently suppressed, so that the separator was considered to have higher reliability.

Evaluation of Dispersibility of Insulating Fine Particles

Comparative Example 2

A slurry for forming an insulating layer was produced in the same manner as Example 1 except that the ammonium polyacrylate (dispersing agent) was not used. It was confirmed that d10, d30, d50, and d90 of the plate-like boehmite dispersed in water were 1.05 µm, 1.83 µm, 2.72 µm, and 4.82 µm, respectively, that the average particle size was 2.72 µm, and that the proportion of particles with a particle size of 1 µm or less was less than 10 vol % and the proportion of particles with a particle size of 3 µm or more was 50 vol % or more.

Example 36

A slurry for forming an insulating layer was produced in the same manner as Example 2 except that the ammonium polyacrylate (dispersing agent) was not used. It was confirmed that d10, d30, d50, and d90 of the alumina dispersed in water were 0.53 µm, 0.70 µm, 0.85 µm, and 1.32 µm, respectively, that the average particle size was 0.85 µm, and that the proportion of particles with a particle size of 1 µm or less was 50 vol % or more and the proportion of particles with a particle size of 3 µm or more was 10 vol % or less.

Example 37

A slurry for forming an insulating layer was produced in the same manner as Example 3 except that the ammonium polyacrylate (dispersing agent) was not used. It was confirmed that d10, d30, d50, and d90 of the plate-like alumina dispersed in water were 0.55 µm, 0.88 µm, 1.22 µm, and 1.43 µm, respectively, that the average particle size was 1.22 µm, and that the proportion of particles with a particle size of 1 µm or less was 30 vol % or more and the proportion of particles with a particle size of 3 µm or more was 10 vol % or less.

To evaluate the dispersibility of the insulating fine particles in the slurries of Examples 1 to 3, 36, and 37 and Comparative Example 2, each of the slurries was applied to the surface of a copper foil using an applicator and dried, thereby forming a porous insulating layer (with a thickness of 20 µm) having both ion permeability and heat resistance.

An evaluation cell was prepared in such a manner that metallic lithium was arranged opposite to the insulating layer of the copper foil, and both the copper foil having the insulating layer and the metallic lithium were immersed in the electrolyte. The electrolyte was a solution obtained by dissolving $LiPF_6$ at a concentration of 1 mol/l in a solvent containing an ethylene carbonate and a dimethyl carbonate at a volume ratio of 1:2.

A current with a current density of 1 mA/cm² flowed into the evaluation cell for 1 minute, and then the current value was successively increased in increments of 0.1 mA/cm². The current value at the time a short circuit occurred was defined as a short circuit current of the insulating layer. Table 2 shows the results.

TABLE 2

| | Configuration of slurry for forming insulating layer | | Short circuit current (mA/cm²) |
|---|---|---|---|
| | Insulating fine particles | Dispersing agent | |
| Example 1 | Plate-like boehmite | Ammonium polyacrylate | 24.7 |
| Example 2 | Polyhedral alumina | Ammonium polyacrylate | 7.8 |
| Example 3 | Plate-like alumina | Ammonium polyacrylate | 21.4 |
| Comparative Example 2 | Plate-like boehmite | None | 3.3 |
| Example 36 | Polyhedral alumina | None | 4.5 |
| Example 37 | Plate-like alumina | None | 6.5 |

As shown in Table 2, the insulating layers formed of the slurries of Examples 1 to 3 including the dispersing agent had a larger short circuit current compared to those formed of the slurries of Examples 36, 37 and Comparative Example 2 including no dispersing agent, and it was clear that the occurrence of a short circuit was suppressed. The reason for this is considered as follows. The insulating fine particles are more uniformly dispersed in the slurries of Examples 1 to 3 than in the slurries of Examples 36, 37 and Comparative Example 2. Therefore, the use of the slurries of Examples 1 to 3 can provide the insulating layer with higher homogeneity. Accordingly, the movement of lithium ions in the insulating layer becomes more uniform, and the growth of dendrite due to current concentration can be suppressed. In particular, when the plate-like insulating fine particles are used, the short circuit current is significantly increased by the addition of the dispersing agent, and thus the effect of improving the dispersibility of the particles by the dispersing agent is increased.

Integration of Electrode and Separator

Examples 38 to 44

Each of the slurries of Examples 1 to 7 was uniformly stirred and defoamed. Then, the slurry was applied to both surfaces of the same negative electrode as that produced in Example 22 using a die coater and dried, so that a separator including the insulating layer with a thickness of 20 µm per one surface was formed on the surface of the negative electrode. However, since the slurry of Example 7 included the antifoaming agent, the defoaming treatment was not necessary.

The same positive electrode as that used in Example 22 and the above negative electrode integrated with the separator were stacked and wound in a spiral fashion to form an electrode assembly having a wound structure. Lithium secondary batteries of Examples 38 to 44 were produced in the same manner as Example 22 except that this electrode assembly was used. Table 3 shows the slurries used for the production of the lithium secondary batteries of Examples 38 to 44.

TABLE 3

| Lithium secondary battery | Slurry for forming insulating layer |
|---|---|
| Example 38 | Example 1 |
| Example 39 | Example 2 |
| Example 40 | Example 3 |
| Example 41 | Example 4 |
| Example 42 | Example 5 |
| Example 43 | Example 6 |
| Example 44 | Example 7 |

The charge-discharge characteristics of the lithium secondary batteries of Examples 38 to 44, including the negative electrode integrated with the insulating layer (separator) composed of the respective slurries of Examples 1 to 7, were evaluated in the same manner as the lithium secondary batteries of Examples 22 to 35. The evaluation confirmed that all the batteries of Examples 38 to 44 achieved the discharge capacity comparable to the rated capacity, and had good charge-discharge characteristics and reliability.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

The slurry for forming an insulating layer of the present invention is capable of achieving the uniform dispersion of the insulating fine particles and maintaining the dispersion state stably. The separator for an electrochemical device of the present invention is produced using the slurry for forming an insulating layer and thus can have excellent heat resistance. The electrochemical device of the present invention includes the separator for an electrochemical device and thus can have high reliability.

The invention claimed is:

1. A method for producing an electrochemical device comprising a positive electrode, a negative electrode, and a separator for the electrochemical device, the method comprising:
applying a slurry for forming an insulating layer to a resin porous base material; and
drying the base material to which the slurry for forming the insulating layer is applied,
wherein the slurry for forming the insulating layer comprises heat-resistant insulating fine particles, a binder, a thickening agent, a dispersion medium, and a dispersing agent,
the resin porous base material is a uniaxially- or biaxially-oriented microporous film,
the microporous film includes a thermoplastic resin with a melting point of 80° C. to 150° C.,
the insulating fine particles are dispersed in the dispersion medium,
the dispersion medium includes water in an amount of 70 mass % or more of the components of the dispersion medium,
a content of the binder in the slurry for forming the insulating layer is 1 to 20 per 100 of the insulating fine particles when expressed as a volume ratio,
a content of the dispersing agent in the slurry for forming the insulating layer is 0.1 to 5 parts by mass per 100 parts by mass of the insulating fine particles,
the slurry for forming the insulating layer has a viscosity of 5 to 500 mPa·s,
a proportion of particles with a particle size of 1 μm or less in the insulating fine particles is 30 vol % or more and a proportion of particles with a particle size of 3 μm or more in the insulating fine particles is 10 vol % or less, and
the insulating layer is formed on both sides or a positive electrode side of the microporous film.

2. The method for producing an electrochemical device according to claim 1, wherein a proportion of particles with a particle size of 2 μm or more in the insulating fine particles is 10 vol % or less.

3. The method for producing an electrochemical device according to claim 1, wherein the insulating fine particles are fine particles of at least one selected from the group consisting of alumina, silica, $TiO_2$, $BaTiO_3$, $ZrO_2$, kaoline, zeolite, apatite, and boehmite.

4. The method for producing an electrochemical device according to claim 1, wherein the insulating fine particles include plate-like particles.

5. The method for producing an electrochemical device according to claim 1, wherein the insulating fine particles include secondary particles formed by agglomeration of primary particles.

6. The method for producing an electrochemical device according to claim 1, wherein the slurry for forming the insulating layer comprises as the thickening agent at least one selected from the group consisting of polyethylene glycol, a polyacrylic acid, polyvinyl alcohol, a cellulose derivative, and a natural polysaccharide.

7. The method for producing an electrochemical device according to claim 1, wherein a content of the thickening agent in the slurry for forming the insulating layer is 0.1 vol % or more of a total volume of solids in the slurry.

8. The method for producing an electrochemical device according to claim 1, wherein the dispersing agent includes a plurality of ion-dissociable acid groups or salt groups.

9. The method for producing an electrochemical device according to claim 8, wherein the dispersing agent is at least one selected from the group consisting of polycarboxylate, polyacrylate, and polymethacrylate.

10. The method for producing an electrochemical device according to claim 1, wherein the slurry for forming the insulating layer comprises as the binder at least one selected from the group consisting of an ethylene-vinyl acetate copolymer having 20 to 35 mol % of a structural unit derived from vinyl acetate, a (meta) acrylic acid copolymer, fluororubber, styrene-butadiene rubber, polyvinyl alcohol, polyvinyl butyral, polyvinyl pyrrolidone, poly-N-vinylacetamide, polyurethane, and an epoxy resin.

11. The method for producing an electrochemical device according to claim 1, wherein the slurry for forming the insulating layer further comprises an antifoaming agent.

* * * * *